United States Patent [19]

Sugiura

[11] Patent Number: 5,404,300
[45] Date of Patent: Apr. 4, 1995

[54] AUTOMOBILE INTEGRATED WIRING SYSTEM

[75] Inventor: Kazumasa Sugiura, Katsuta, Japan

[73] Assignee: Hitachi, Ltd., Tokyo, Japan

[21] Appl. No.: 191,725

[22] Filed: Feb. 4, 1994

Related U.S. Application Data

[63] Continuation of Ser. No. 664,391, Mar. 4, 1991.

[30] Foreign Application Priority Data

Mar. 8, 1990 [JP] Japan ................................. 2-55119

[51] Int. Cl.$^6$ .......................... H04J 3/02; G06F 11/14
[52] U.S. Cl. ........................... 364/424.05; 364/424.01;
307/40; 307/38
[58] Field of Search ................ 364/424.05, 424.01;
307/40, 41, 38, 39; 371/22, 67.1, 68.1, 68.2;
370/67

[56] References Cited

U.S. PATENT DOCUMENTS

| | | | |
|---|---|---|---|
| 4,302,841 | 11/1981 | McCulloch | 371/70 |
| 4,554,461 | 11/1985 | Oho et al. | 307/40 |
| 4,835,671 | 5/1989 | Sato | 364/186 |
| 4,864,568 | 9/1989 | Sato | 371/8.2 |
| 5,121,386 | 6/1992 | Wolfsgruber et al. | 370/85.1 |

FOREIGN PATENT DOCUMENTS

| | | |
|---|---|---|
| 0328235 | 8/1989 | European Pat. Off. . |
| 3731142 | 4/1988 | Germany . |
| 60107944 | 9/1989 | Japan . |

OTHER PUBLICATIONS

I.E.E Proceedings Section A A I vol. 129, No. 6, Nov. 1982, G.B. pp. 223-228 Preston et. al "Multiprocessor Implementation of the Logic Function of a Multiplexed Wiring System for Automotives" p. 226, col. 1, lines 1-12, figure 5.

Primary Examiner—Vincent N. Trans
Attorney, Agent, or Firm—Ladas & Parry

[57] ABSTRACT

An automobile integrated wiring system has a central control unit adapted to act upon operator control instructions. The central control unit is arranged to provide output signals over a transmission path to a plurality of controllable peripheral devices each of the peripheral devices being arranged to perform a control function of the automobile. At least one of the peripheral devices includes detecting means for detecting an abnormality in the central control unit and means adapted to accept operator control instructions over the transmission path when the central control unit is detected to have an abnormality so that an appliance associated with the peripheral device may be operated by said peripheral device in the absence of instruction from the central control unit.

7 Claims, 4 Drawing Sheets

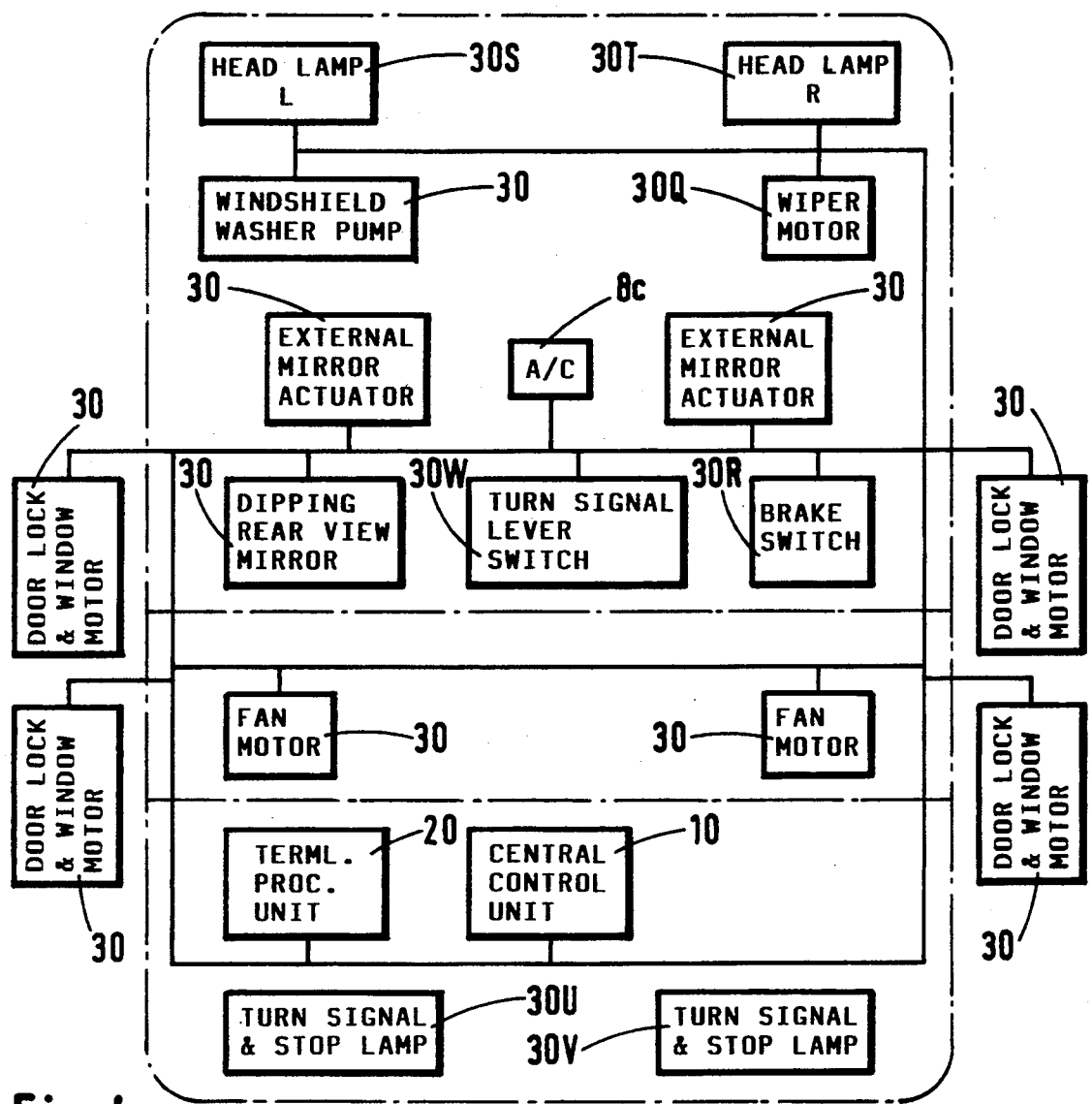
Fig.4
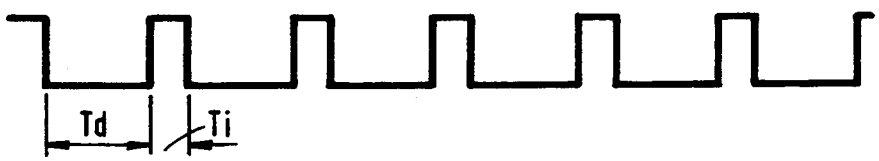
Fig.5(a) NORMAL TRANSMISSION
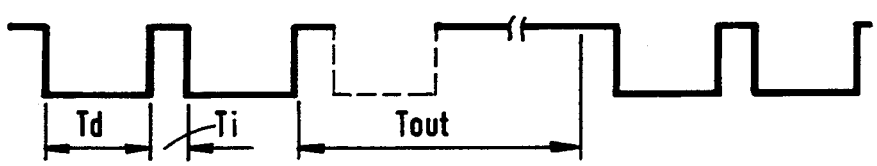
Fig.5(b) ABNORMAL TRANSMISSION

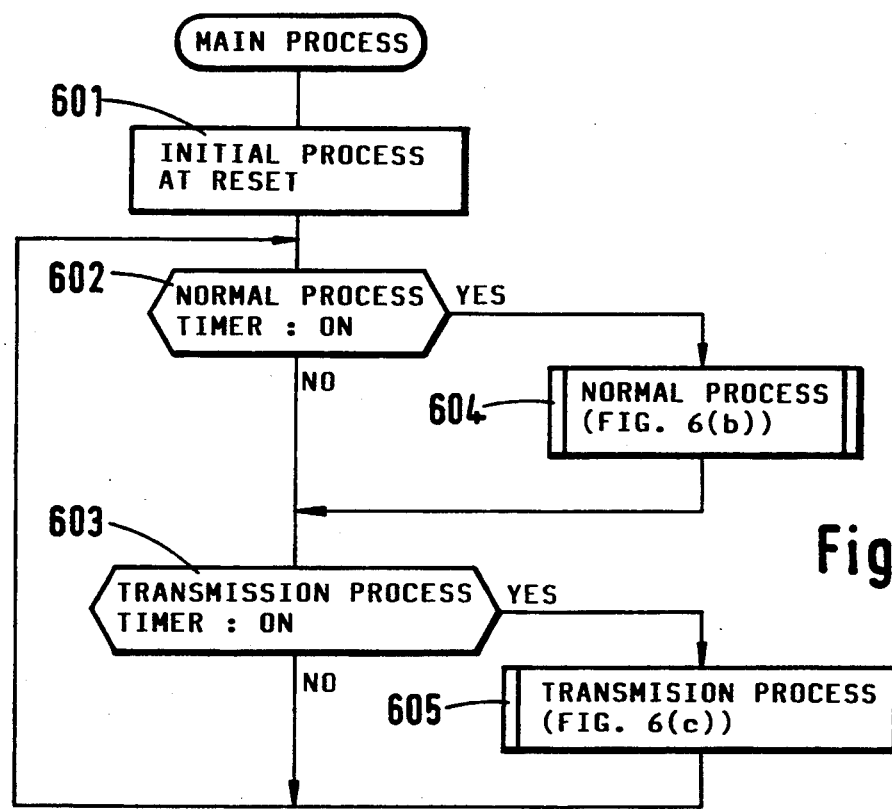
Fig.6(a)
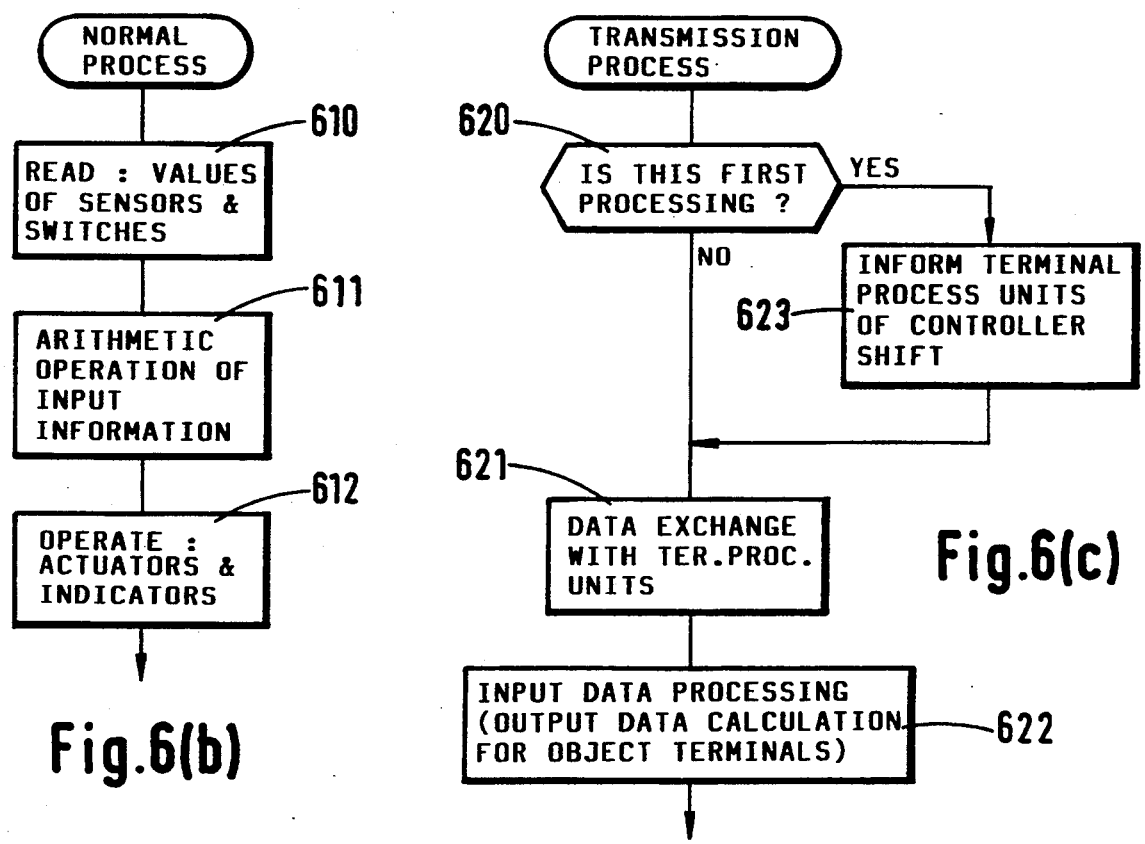
Fig.6(b)
Fig.6(c)

AUTOMOBILE INTEGRATED WIRING SYSTEM

This is a continuation of copending application Ser. No. 07/664,391, filed on Mar. 4, 1991.

BACKGROUND OF THE INVENTION a) Field of the Invention

The present invention relates to an integrated wiring system for an automobile and in particular to a backup system for an integrated wiring system for use in automobiles.

b) Description of the Prior Art

It is known to provide an integrated wiring system for data transmission from a central control unit to a plurality of peripheral processing units, the data transmission being executed under the supervision and control of the central control unit. In this respect, the central control unit is adapted to act upon operator control instructions and to provide output signals indicative of the operator control instructions to a plurality of controllable peripheral devices each of which is adapted to perform a control function. However, when any trouble or abnormality occurs in the central control unit, data transmission is stopped throughout the whole system. Therefore, it is required to provide a fail-safe function using a backup system so as to overcome such data transmission failure, especially when the integrated wiring system is applied to automobiles.

So as to try and overcome the possibility of data transmission failure, it is disclosed in Japanese Patent Laid-Open No. 60-107944 (1985), that data transmission is interrupted because of an occurrence of an abnormality in a central control unit and each of a plurality of peripheral processing units is rendered operative to perform a fail-safe function. Thus, for example, a peripheral terminal processing unit which is assigned responsibility for the control of a lamp of an automobile, operates to turn the lamp ON or OFF in dependence upon the condition which is a fail-safe mode. However, in such a fail-safe condition it is not possible for the operator, for example, a driver, to alter the lamp condition. Where the lamp is a turn indicator or the peripheral device is a wiper motor then the fail-safe condition is normally an OFF condition. Because such a condition cannot be overridden by an operator, it will be appreciated that safety of the automobile is endangered.

The object of this present invention is to provide an integrated wiring system, having improved safety.

SUMMARY OF THE INVENTION

According to this invention there is provided an automobile integrated wiring system having a central control unit adapted to act upon operator control instructions and to provide output signals indicative thereof over a transmission path to a plurality of controllable peripheral device means, each of which is adapted to perform a control function of the automobile, characterized in that at least one of the peripheral devices includes detecting means for detecting an abnormality in said central control unit, and means adapted to accept operator control instructions over said transmission path when said central control unit is detected to have an abnormality whereby said control function is maintained.

Preferably, said peripheral device means includes a microcomputer device adapted to determine abnormality in said central control unit and to thereupon actuate an automobile appliance or control other peripheral device means.

Advantageously, said appliance is one of a head lamp, a rear lamp, a brake stop lamp, a turn indicator lamp, a turn indicator switch, a door lock, a window movement actuator, a window washer pump, a wiper actuator, an external mirror actuator, an air condition actuator, a seat actuator, or a navigation system.

Preferably, said central control unit includes means for outputting a pulse pattern and said peripheral device means includes detector means for analysing said pulse pattern and for determining if said pattern is interrupted in excess of a predetermined time whereby if said detector means determines an interruption exists, an abnormality in said central control unit is solved and said peripheral device means directly accepts instructions from said operator for controlling said applicance associated therewith.

BRIEF DESCRIPTION OF THE DRAWINGS

The invention will now be described, by way of example, with reference to the accompanying drawings in which:

FIG. 4 shows an arrangement of the integrated wiring system peripheral devices in an automobile, FIGS. 5(a) and 5(b) show the signal transmission signals in a normal and abnormal condition respectively, and FIGS. 6(a) to 6(c) show flow diagrams of the operation of the present invention.

In the Figures like reference numerals denote like parts.

DESCRIPTION OF THE PREFERRED EMBODIMENT

Figure 1:
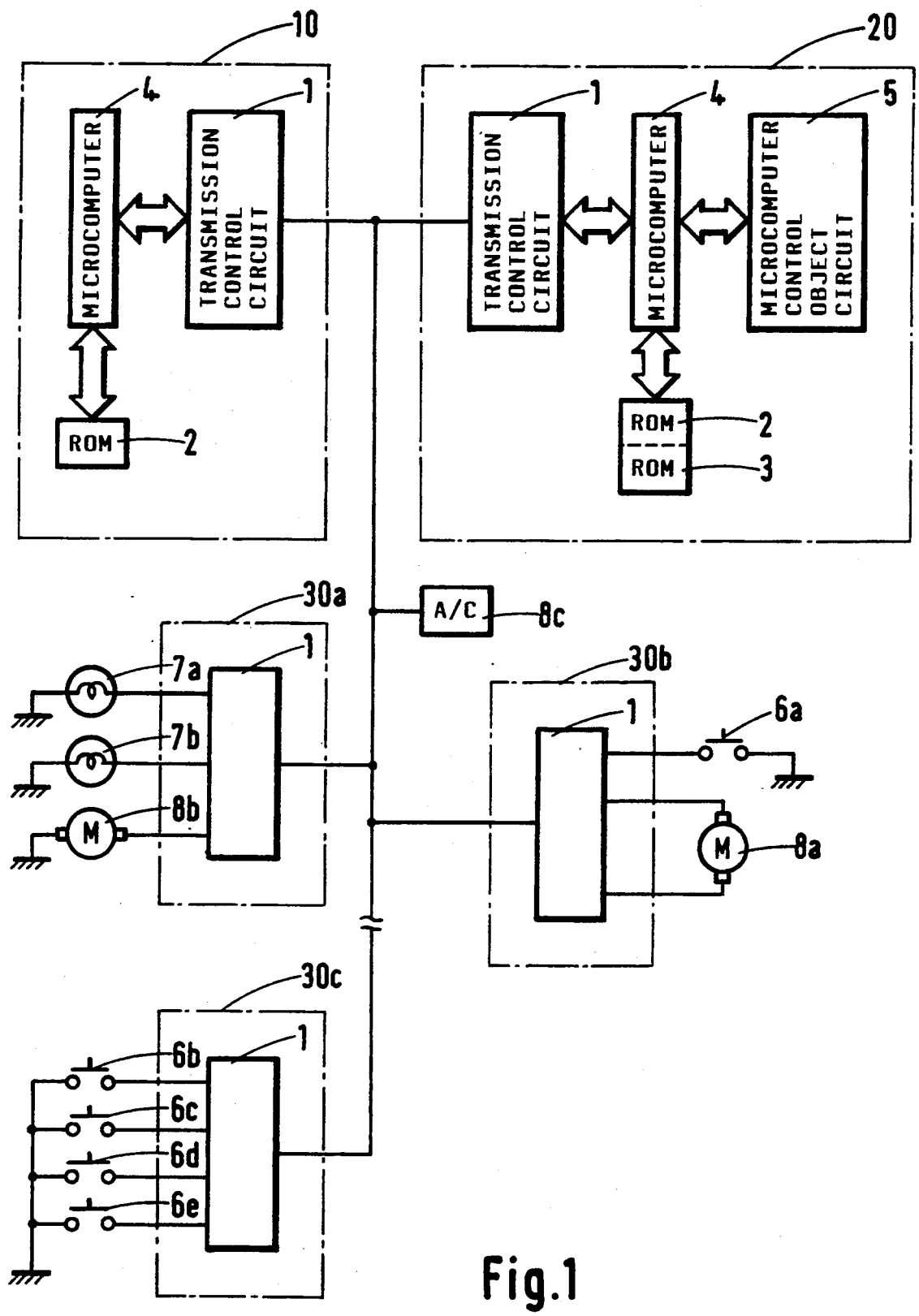
FIG. 1 shows in block schematic form an integrated wiring system according to this invention.

The integrated wiring system shown in FIG. 1 has a central control unit 10, an onboard peripheral device comprising a microcomputer device integrated terminal processing unit 20, a plurality of terminal processing units 30a-30c, and a transmission path, for example, a multiple signal transmission line A connecting each of the units.

In particular, the central control unit 10 has a signal transmission control circuit 1, a microcomputer 4, and a Read Only Memory (ROM) 2. The onboard microcomputer device integrated terminal processing unit 20 has a signal transmission control circuit 1, a microcomputer 4, a ROM 2 and a ROM 3, and a microcomputer control object circuit 5 for controlling one of the numerous object onboard electronic appliances, examples of which are shown in FIG. 4. The microcomputer control object circuit 5 is applied in the exemplary embodiment of FIGS. 1 and 2, to control an automatic air-conditioner 8c.

Other terminal processing units 30a, 30b and 30c comprise transmission path control circuits 1, and are contemplated to drive and control various onboard electronic appliances such as lamps 7a, 7b, actuators (motors) 8a, 8b and the like, and also to monitor and control signal sources such as switches 6a, 6b, 6b, 6d, 6e and the like.

Figure 2:
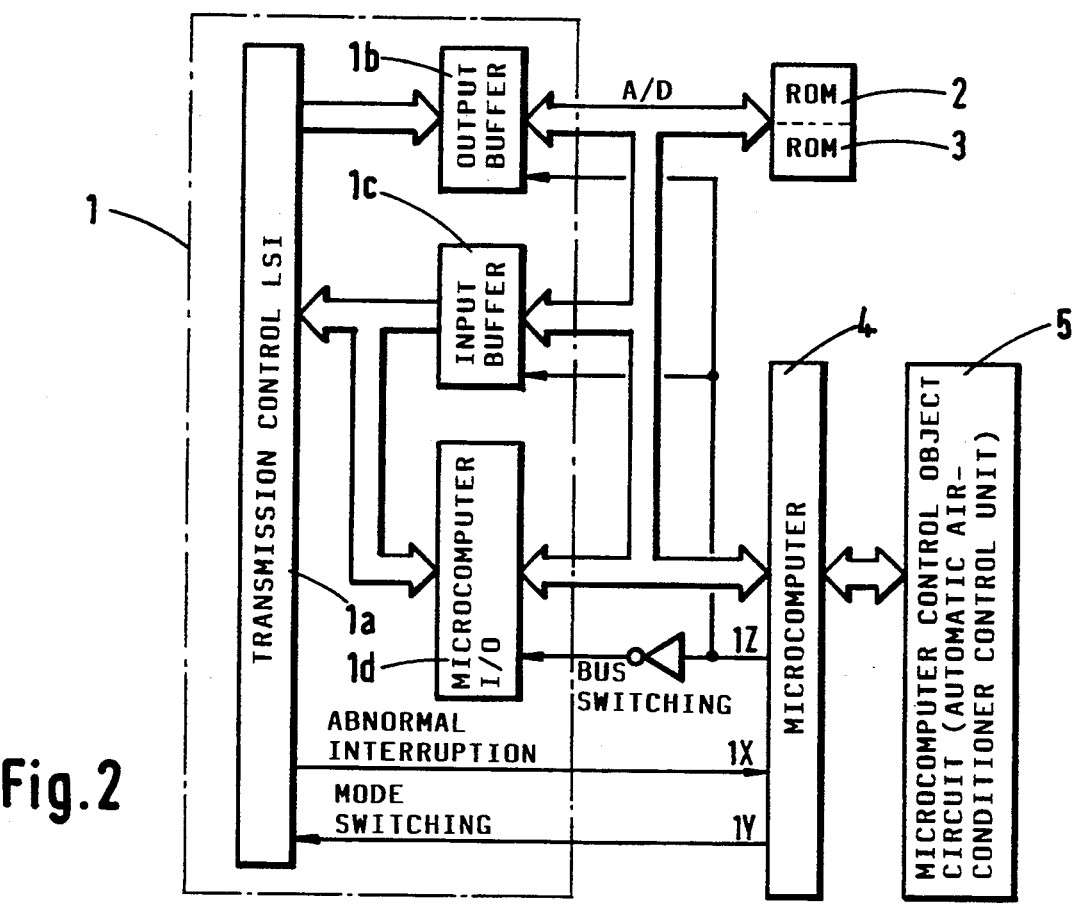
FIG. 2 shows a block diagram of a peripheral device used in this invention.

FIG. 2 shows a detailed block diagram of an onboard microcomputer device integrated terminal processing unit 20, wherein a transmission control circuit 1 comprises a transmission control LSI 1a, an output buffer circuit 1b, an input buffer circuit 1c, and a microcomputer I/O circuit 1d.

Figure 3:
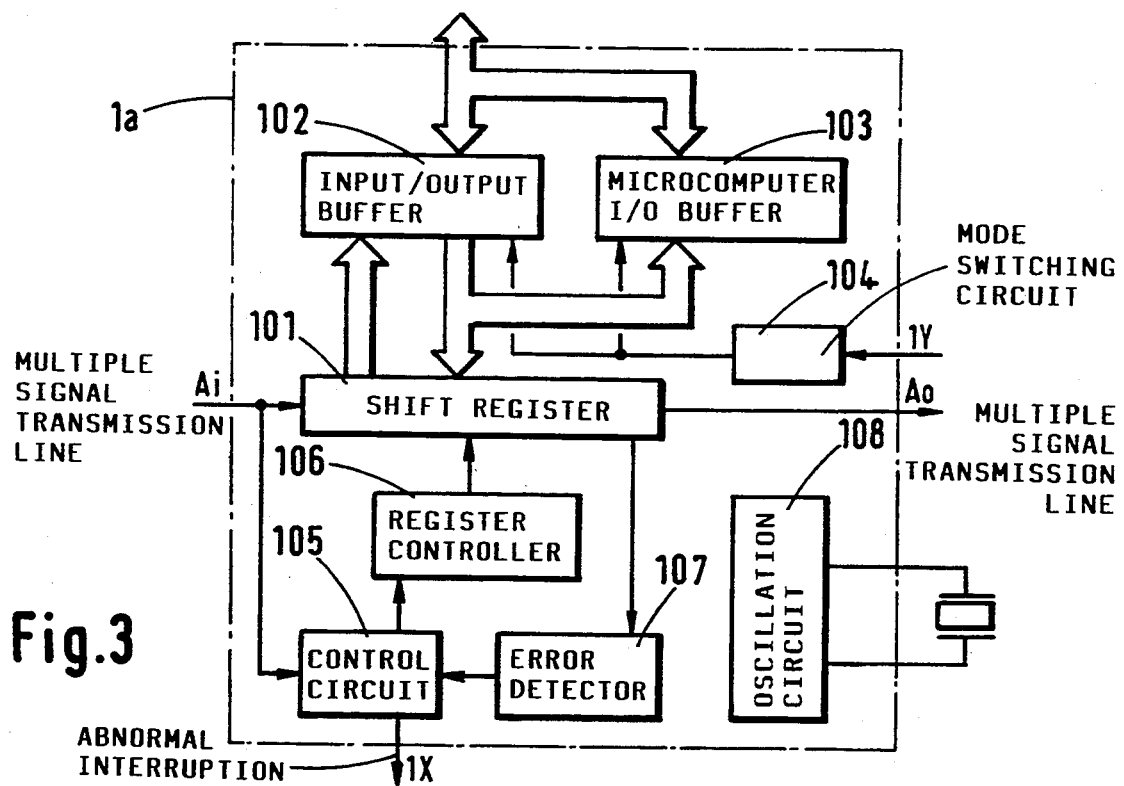
FIG. 3 shows a block diagram of a transmission control LSI.

FIG. 3 shows a detailed block diagram of the transmission control circuit LSI 1a comprising a shift register 101, an input/output buffer 102, a microcomputer I/O buffer 103, a mode switching circuit 104, a control circuit 105, a register controller 106, an error detection unit 107, and an oscillation circuit 108.

FIG. 4 shows the disposition of exemplary units/devices in a car body, indicating positions of terminal processing units 30, which may or may not be subjected to control in the event of central control unit 10 failure. In FIG. 4, terminal processing units 30Q, 30R, 30S, 30T, 30U, 30V and 30W are subject to control under abnormal operating conditions by an associated terminal processing unit 20.

The operation of the invention will now be explained.

In FIG. 1, the central control unit 10, onboard microcomputer device integrated terminal processing unit 20 and respective terminal processing units 30a, 30b, and 30c communicate with one another through the multiple signal transmission line A.

The central control unit 10 microcomputer 4 is operated according to a program stored in the ROM 2. The circuit functions: to generate a transmission signal by a transmission control circuit 1 and exchange data with terminal processing units through the multiple signal transmission line A; to monitor the ON/OFF positions of switches 6a, 6b, 6c, 6d and 6e connected to terminal processing units 30b, 30c; to generate control data to control various lamps 7a, 7b and electric motors 8a, 8b; and to transmit the control data to respective terminal processing units through the multiple signal transmission line A.

The onboard microcomputer device integrated terminal processing unit 20 also has a transmission control circuit 1 for monitoring the multiple signal transmission line A. Only when addressed by the central control unit 10 does the unit 20 perform its operation in response to an address, thereby transmitting the ON/OFF state of switches and the like, or operating the motors or lamps or the like according to the control data from the central control unit 10. This series of transmissions is executed over transmission line A, during normal operation, and is formed by a transmission pattern as shown in FIG. 5(a), having a repetition cycle Td+Ti, which is the sum of transmission data Td and a wait time Ti.

Referring to FIG. 3, the transmission control circuit 1 has an LSI 1a which includes a control circuit 105 that monitors the address section in the transmitted signal received on line input Ai to detect whether or not it is addressed. When the signal does address the control circuit 105, the circuit 105 transfers control data being input to a shift register 101 which then applies the control data to an input/output buffer 102 under the control of the register controller 106. Switch monitor data in the input/output buffer 102 is then transferred to the shift register 101 which then outputs a signal to the multiple signal transmission line on line Ao. When an error is detected in the error detection section 107, the control circuit 105 controls the shift register 101 through the register control section 106 to cancel the signal from the multiple signal transmission line.

On the other hand, when the control circuit 105 scans through the address section of the transmitted signal and finds the transmitted signal being addressed to other transmission control circuits, the signal is ignored.

Thus, the control circuit is always monitoring the multiple signal transmission A. When interruption in signal transmission occurs for some reason, indicated by cessation of the pulse train Td for a period of time exceeding Tout, as shown in FIG. 5(b), the control circuit 105 detecting the signal judges that an abnormality has occurred, thereby turning on an abnormality interruption signal 1X on an output line from the circuit 105.

In FIG. 2, the microcomputer 4 in the onboard microcomputer device integrated terminal processing unit 20 operates with its bus switch signal turned OFF during normal operation, and exchanges data with the transmission control circuit 1 through the microcomputer I/O circuit 1d. The unit 20 receives control data from the central control unit 10 through the transmission control LSI 1a and an output buffer circuit 1b, and outputs monitor data to the central control unit 10 through an input buffer circuit 1c.

Under normal operating conditions, the onboard electric appliance of a control object assigned to the terminal processing unit, for example, the air-conditioner in the present embodiment, is controlled by a program stored in the ROM 3.

Referring now to FIG. 6(a) which shows a general process flow in the microcomputer 4.

Step 601:

Is an initial process at power-on reset of the microcomputer 4, wherein setting and clearing flags or memories is performed. In addition, a routine process is facilitated by setting an installed timer.

Step 602:

A flag set by a timer is monitored, and a decision is made whether or not to proceed with a normal processing routine.

Step 603:

Similarly, a flag set by a transmission process timer is monitored, but the flag is not set unless an abnormal interruption signal 1X from the transmission control LSI 1a is turned ON. If the abnormal interruption signal 1X is ON, then a transmission communication processing routine is performed at step 605.

Therefore, the microcomputer 4 always executes the decisions made in the steps 602 and 603.

In the following, the normal processing of step 604 is explained with reference to FIG. 6(b).

Step 610:

The microcomputer 4 of the central control unit 10 reads out ON/OFF information of various sensors and switches.

Step 611:

Various arithmetic operations are executed according to the input information given through the step 610.

Step 612:

According to the results of processing in step 611, respective indicator lamps and actuators, such as electric motors and the like, are operated.

The above normal processing is divided into each object (appliance) control function, and according to the function the normal process 604 is executed. Relating, for instance, to an automatic air-conditioner, its temperature adjustment is performed by calculating the cooling air flow or warm air flow required based on the input data of signals from temperature sensors disposed in each part of the automobile cabin to maintain a preset temperature by opening and closing a cooling air or warm air supply valve while the air flow rate is calculated and the number of revolutions of an air flow adjustment fan is, accordingly, controlled.

Next, a process under an abnormality occurrence is explained.

When the microcomputer 4 of the peripheral device 20 detects from its transmission control LSI 1a that the abnormality interruption signal 1X is ON, it turns on a mode switching signal 1Y, and switches the transmission control LSI 1a from a terminal (peripheral) processing unit mode to a central control unit mode. At the same time, it turns ON a bus switching signal 1Z, and turns OFF the output buffer circuit 1b and the input buffer circuit 1c, but turns ON the microcomputer I/O circuit 1d. Also, when the mode switching signal 1Y is turned ON, the transmission control LSI 1a turns OFF the input/output buffer 102, and turns ON the microcomputer I/O buffer 103, so as to directly communicate with the microcomputer, assuming that the control mode required is controllable by the microcomputer 4.

The onboard microcomputer equipment integrated terminal processing unit 20, thus through switching the transmission control circuit 1, assumes a control mode controllable by its microcomputer 4. Then, the microcomputer 4 is operated to start the network backup program stored in the ROM 2.

At step 603 when the timer turns ON, a transfer to the transmission process step 605 is facilitated.

The transmission process 605 is operated as shown in FIG. 6(c).

At step 620, it is judged whether the transmission communication process is the first one or not. If it is, an initial process step 623 is executed wherein the terminal processing units are informed of the shift of control from the central processing unit to the onboard microcomputer integrated terminal processing units 20.

At step 621 data exchange is performed with the terminal processing units to be supported, and at step 622 output data from the terminal processing units is calculated for the object terminals, and the results of the calculations are stored.

The above calculated results are used as transmission data in the next time operation of step 621.

The transmission process 605 is activated cyclically by the installed timer in the microcomputer 4 of device 20, so that the object of control is assured of operation as if a normal operation was being effected by the central control unit.

Thus, in the present invention, because the onboard microcomputer equipment integrated terminal processing unit 20 operates in the event of an abnormality or failure in the central control unit 10, the same quality of control as that in normal operation is given to the various object equipments. Thus, the invention has the advantage that the whole system is prevented from breaking down, and safety of the driving operation is continued.

It is to be understood that the invention has been described with reference to exemplary embodiments, and modifications may be made without departing from the spirit and scope of the invention as defined in the appended claims.

I claim:

1. In an automobile integrated wiring system having a central control unit provided with means for data transmission control adapted to act upon operator control instructions and to provide output signals indicative thereof over a transmission path to a plurality of peripheral device means, each of which is adapted to perform a control function of the automobile, the improvement wherein at least one of the peripheral devices includes detecting means for detecting an abnormality in said central control unit, back-up control means at least partially corresponding to said data transmission control means of said central control unit so as to assume data transmission control upon detection of occurrence of an abnormality in said central control unit thereby to secure data transmission over the transmission path thereof, means adapted to accept operator control instructions over said transmission path when said central control unit is detected to have an abnormality, means for performing data exchange with other said peripheral device means, computing means for calculating data required to be output by said other said peripheral device means for those said other said peripheral device means to perform their control functions, and transmitting means for transmitting the result of said calculation by said computing means to said other peripheral means whereby said control function is maintained.

2. A system as claimed in claim 1 wherein said peripheral device means includes a microcomputer device adapted to determine abnormality in said central control unit and to thereupon actuate an automobile appliance.

3. A system as claimed in claim 2 wherein said appliance is one of a headlamp, a rear lamp, a brake stop lamp, a turn indicator lamp, a turn indicator switch, a door lock, a window movement actuator, a window washer pump, a wiper actuator, an external mirror actuator, an air-condition actuator, a seat actuator, a navigation system.

4. A system as claimed in claim 1 wherein said central control unit includes means for outputting a pulse pattern and said peripheral device means includes detector means for analysing said pulse pattern and for determining if said pattern is interrupted in excess of a predetermined time whereby if said detector means determines an interruption exists, an abnormality in said central control unit is solved and said peripheral device means directly accepts instructions from said operator for controlling said appliance associated therewith.

5. A system as claimed in claim 1 wherein said peripheral device means includes a microcomputer device adapted to determine abnormality in said central control unit and to control other peripheral device means.

6. An automobile integrated wiring system having a central control unit provided with means for data transmission control adapted to act upon operator control instructions and to provide output signals indicative thereof over a transmission path to a plurality of peripheral device means, each of which is adapted to perform a control function of the automobile, at least one of the peripheral devices including:

(a) detecting means for detecting an abnormality in said central control unit, (b) memory means which stores a data transmission control program whereby transmission and reception of control data between respective peripheral device means is executed, (c) back-up control means at least partially corresponding to said data transmission control means of said central control unit so as to assume data transmission control upon detection of occurrence of an abnormality in said central control unit, thereby to secure data transmission over the transmission path thereof, (d) means accepting operator control instructions over said transmission path when said central control unit is detected to have an abnormality, (e) means performing data exchange with other said peripheral device means, (f) computing means calculating data required to be output by said other peripheral device means for said other peripheral device means to perform their control functions, and (g) transmitting means transmitting the result of said calculation by said computing means to said other peripheral means whereupon said at least one peripheral device means executes the transmission control program to said other peripheral device means in accordance with said stored transmission control program instead of said control being effected by said central control unit so that said operator control function is performed via said at least one peripheral device means.

7. A system as claimed in claim 6 wherein judging means are provided for judging if the abnormality detected by said detecting means is the first time said abnormality is detected and if it is then the memory means is triggered to execute said data transmission control program.

* * * * *